(12) United States Patent
Kincaid et al.

(10) Patent No.: US 10,155,444 B2
(45) Date of Patent: Dec. 18, 2018

(54) DISCONNECTING ALL-WHEEL DRIVE DRIVELINE HAVING FLAT TOW CAPABILITIES

(71) Applicant: American Axle & Manufacturing, Inc., Detroit, MI (US)

(72) Inventors: Jeffrey L. Kincaid, Clarkston, MI (US); Thomas C. Paluch, Metamora, MI (US); Ryan M. Baeder, White Lake, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 15/861,004

(22) Filed: Jan. 3, 2018

(65) Prior Publication Data

US 2018/0126846 A1 May 10, 2018

Related U.S. Application Data

(63) Continuation of application No. 14/946,809, filed on Nov. 20, 2015, now Pat. No. 9,895,971.

(51) Int. Cl.
*B60K 17/348* (2006.01)
*F16H 48/30* (2012.01)
*F16H 48/08* (2006.01)
*B60K 23/08* (2006.01)

(52) U.S. Cl.
CPC .......... *B60K 17/348* (2013.01); *B60K 17/352* (2013.01); *B60K 23/08* (2013.01); *F16H 48/08* (2013.01); *B60K 2023/0833* (2013.01); *B60K 2023/0858* (2013.01); *B60Y 2300/28* (2013.01); *B60Y 2400/422* (2013.01)

(58) Field of Classification Search
CPC .................................................... B60K 17/348
See application file for complete search history.

(56) References Cited

U.S. PATENT DOCUMENTS

| | | | |
|---|---|---|---|
| 4,625,584 A | 12/1986 | Onodera | |
| 4,699,235 A | 10/1987 | Anderson | |
| 8,313,407 B2 | 11/2012 | Ekonen et al. | |
| 8,608,611 B2 | 12/2013 | Ekonen et al. | |
| 8,814,740 B2 | 8/2014 | Bradley et al. | |
| 8,888,647 B2 | 11/2014 | Ekonen et al. | |
| 8,986,151 B2 | 3/2015 | Valente et al. | |
| 9,028,357 B2 | 5/2015 | Peura et al. | |
| 9,102,234 B2 | 8/2015 | Cook et al. | |

(Continued)

*Primary Examiner* — Derek D Knight
(74) *Attorney, Agent, or Firm* — Harness, Dickey & Pierce, P.L.C.

(57) ABSTRACT

An all-wheel drive vehicle driveline that includes a PTU input member, a spindle, a stub shaft, an axle shaft, a PTU clutch and a stub shaft clutch. The PTU input member, the spindle, the stub shaft and the axle shaft are rotatable about a first rotary axis. The axle shaft is received through the spindle. The PTU clutch is operable in a first PTU clutch mode, in which the PTU input member is rotatably coupled to the spindle, and a second PTU clutch mode in which the PTU input member is rotatably decoupled from the spindle. The stub shaft clutch is operable in a first stub shaft clutch mode, in which the stub shaft is rotatably coupled to the axle shaft, and a second stub shaft clutch mode, in which the stub shaft is rotatably de-coupled from the axle shaft.

21 Claims, 9 Drawing Sheets

(56) References Cited

U.S. PATENT DOCUMENTS

| | | |
|---|---|---|
| 9,108,511 B2 | 8/2015 | Janson |
| 9,895,971 B2 * | 2/2018 | Kincaid ............... B60K 17/348 |
| 9,902,262 B2 * | 2/2018 | Kincaid ............... B60K 17/348 |
| 2011/0039652 A1 | 2/2011 | Ekonen et al. |
| 2016/0236567 A1 | 8/2016 | Uchida et al. |
| 2017/0036540 A1 | 2/2017 | Yoshimura |

* cited by examiner

DISCONNECTING ALL-WHEEL DRIVE DRIVELINE HAVING FLAT TOW CAPABILITIES

CROSS-REFERENCE TO RELATED APPLICATIONS

This application is a continuation of U.S. application Ser. No. 14/946,809 filed Nov. 20, 2015, the disclosure of which is incorporated by reference as if fully set forth in detail herein.

FIELD

The present disclosure relates to disconnecting all-wheel drive drivelines having flat tow capabilities.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction. Such AWD vehicles are typically equipped with a much more complex drivetrain (relative to a FWD architecture) which, in addition to the primary driveline, must include the additional components associated with the secondary driveline such as a power take-off unit and a propshaft.

The primary driveline typically includes a differential unit to provide differential torque to a pair of primary drive wheels (i.e., left and right front wheels). In certain conditions, such as towing the vehicle with the front and rear wheels on the ground (i.e. flat towing), the primary drive wheels can back drive the transmission and powertrain. To this end, there remains a need in the art for development of improved driveline components for use in the disconnectable drivelines of AWD vehicles.

SUMMARY

This section provides a general summary of the disclosure, and is not a comprehensive disclosure of its full scope or all of its features.

The present teachings provide for an all-wheel drive vehicle driveline including a first output member, a second output member, an input member, a first intermediate member, a first sleeve, a second sleeve, a bevel ring gear, and a bevel pinion gear. The first output member can be disposed about a first axis. The first output member can be adapted to be coupled to an output of a differential mechanism for common rotation about the first axis. The second output member can be disposed about the first axis. The input member can be disposed about the first output member. The input member can be adapted to be coupled to an input of the differential mechanism for common rotation about the first axis. The first intermediate member can be disposed about the second output member. The first sleeve can be disposed about the first axis. The first sleeve can be movable along the first axis between a first position, a second position, and a third position. The second sleeve can be disposed about the first axis. The second sleeve can be coupled to the first sleeve for axial translation with the first sleeve. The bevel ring gear can be drivingly coupled to the first intermediate member to receive rotary power therefrom. The bevel pinion gear can be meshingly engaged to the bevel ring gear and rotatable about a second axis that is transverse to the first axis. When the first sleeve is in the first position, the first sleeve can couple the input member to the first intermediate member for common rotation about the first axis. When the first sleeve is in the first position, the second sleeve can be rotatable relative to the first sleeve and can couple the first and second output members for common rotation about the first axis. When the first sleeve is in the second position, the first sleeve can be rotatable relative to at least one of the input member or the first intermediate member. When the first sleeve is in the second position, the second sleeve can be rotatable relative to the first sleeve and can couple the first and second output members for common rotation about the first axis. When the first sleeve is in the third position, the first sleeve can be rotatable relative to at least one of the input member or the first intermediate member. When the first sleeve is in the third position, the second sleeve can be rotatable relative to the first sleeve and at least one of the first or second output members.

The present teachings further provide for an all-wheel drive vehicle driveline including a first output member, a second output member, an input member, a first intermediate member, a first clutch member, a second clutch member, a bevel ring gear, and a bevel pinion gear. The first output member can be disposed about a first axis. The first output member can be adapted to be coupled to an output of a differential mechanism for common rotation about the first axis. The second output member can be disposed about the first axis. The input member can be disposed about the first axis. The input member can be adapted to be coupled to an input of the differential mechanism for common rotation about the first axis. The first intermediate member can be disposed about the second output member. The first clutch member can be disposed about the first axis and movable along the first axis between a first position, a second position, and a third position. The first clutch member can include a first portion, a second portion, and a center portion that can couple the first and second portions for common rotation about the first axis. The first, second, and center portions can define a recess disposed about the first axis. The second clutch member can be disposed about the first axis and can be rotatably received in the recess. The bevel ring gear can be drivingly coupled to the first intermediate member to receive rotary power therefrom. The bevel pinion gear can be meshingly engaged to the bevel ring gear and rotatable about a second axis that is transverse to the first axis. When the first clutch member is in the first position, the first clutch member can couple the input member to the first intermediate member for common rotation about the first axis. When the first clutch member is in the first position, the second clutch member can be rotatable relative to the first clutch member and can couple the first and second output members for common rotation about the first axis. When the first clutch member is in the second position, the first clutch member can be rotatable relative to at least one of the input member or the first intermediate member. When the first clutch member is in the second position, the second clutch member can be rotatable relative to the first clutch member and can couple the first and second output members for common rotation about the first axis. When the first clutch member is in the third position, the first clutch member can be rotatable relative to at least one of the input member or the first intermediate member. When the first clutch member is in the third position, the second clutch member can be rotatable relative to the first clutch member and at least one of the first or second output members.

The present teachings further provide for an all-wheel drive vehicle driveline including a differential mechanism, a first half-shaft, a second half-shaft, an input member, a first intermediate member, a first clutch member, a second clutch member, a bevel ring gear, and a bevel pinion gear. The differential mechanism can include a differential case, a differential gearset, a first differential output, and a second differential output. The differential case can be configured to receive input torque. The differential gearset can be coupled to the differential case to receive input torque therefrom and can be configured to output differential torque to the first and second differential outputs. The first half-shaft can be disposed about a first axis and can be drivingly coupled to the first differential output. The second half-shaft can be drivingly coupled to the second differential output. The input member can be disposed about the first half-shaft. The input member can be drivingly coupled to the differential case to receive torque therefrom. The first intermediate member can be disposed about the first half-shaft. The first clutch member can be disposed about the first axis and movable along the first axis between a first position, a second position, and a third position. The first clutch member can include a first set of splines, a second set of splines, and a recess axially between the first and second sets of splines. The second clutch member can be disposed about the first axis and can be received in the recess for rotation relative to the first clutch member and axial translation with the first clutch member. The second clutch member can include a third set of splines. The bevel ring gear can be drivingly coupled to the first intermediate member. The bevel pinion gear can be meshingly engaged to the bevel ring gear and can be rotatable about a second axis that is transverse to the first axis. When the first clutch member is in the first position, the first set of splines can be engaged with a first set of mating splines on the input member. When the first clutch member is in the first position, the second set of splines can be engaged to a second set of mating splines on the first intermediate member. When the first clutch member is in the first position, the third set of splines can be engaged to a third set of mating splines on the first differential output and the fourth set of mating splines on the first half-shaft. When the first clutch member is in the second position, the first clutch member can be disengaged from either the first or second sets of mating splines and the third set of splines can be engaged to the third and fourth sets of mating splines. When the first clutch member is in the third position, the first clutch member can be disengaged from either the first or second sets of mating splines, and the third set of splines can be disengaged from either the third or fourth sets of mating splines.

In another form, the present teachings provide an all-wheel drive vehicle driveline that includes a PTU input member, a spindle, a stub shaft, an axle shaft, a PTU clutch and a stub shaft clutch. The PTU input member, the spindle, the stub shaft and the axle shaft are rotatable about a first rotary axis. The axle shaft is received through the spindle. The PTU clutch is operable in a first PTU clutch mode, in which the PTU input member is rotatably coupled to the spindle, and a second PTU clutch mode in which the PTU input member is rotatably decoupled from the spindle. The stub shaft clutch is operable in a first stub shaft clutch mode, in which the stub shaft is rotatably coupled to the axle shaft, and a second stub shaft clutch mode, in which the stub shaft is rotatably de-coupled from the axle shaft.

In still another form, the present teachings provide an all-wheel drive vehicle driveline that includes a PTU input member, a spindle, a stub shaft, an axle shaft and a multi-disconnect mechanism. The PTU input member, the spindle, the stub shaft and the axle shaft are rotatable about a first rotary axis. The axle shaft is received through the spindle. The multi-disconnect mechanism has first, second, third fourth and fifth connection members. The first connection member is selectively coupled to a first mating connection member that is coupled to the PTU input member for rotation therewith. The second connection member is selectively coupled to a second mating connection member that is coupled to the spindle for rotation therewith. The third connection member is coupled to the stub shaft for rotation therewith. The fourth connection member is coupled to the axle shaft for rotation therewith. The fifth connection member is selectively coupled to at least one of the third and fourth connection members. The multi-disconnect is selectively operable in a first mode, a second mode and a third mode. The first connection member is rotatably coupled to the first matting connection member, the second connection member is rotatably coupled to the second mating connection member, and the fifth connection member is rotatably coupled to the third and fourth connection members when the multi-disconnect is operated in the first mode. The first connection member is rotatably decoupled from the first mating connection member, the second connection member is rotatably decoupled from the second mating connection member, and the fifth connection member is rotatably coupled to the third and fourth connection members when the multi-disconnect is operated in the second mode. The first connection member is rotatably decoupled from the first mating connection member, the second connection member is rotatably decoupled from the second mating connection member, and the fifth connection member is rotatably decoupled from the third and fourth connection members when the multi-disconnect is operated in the third mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
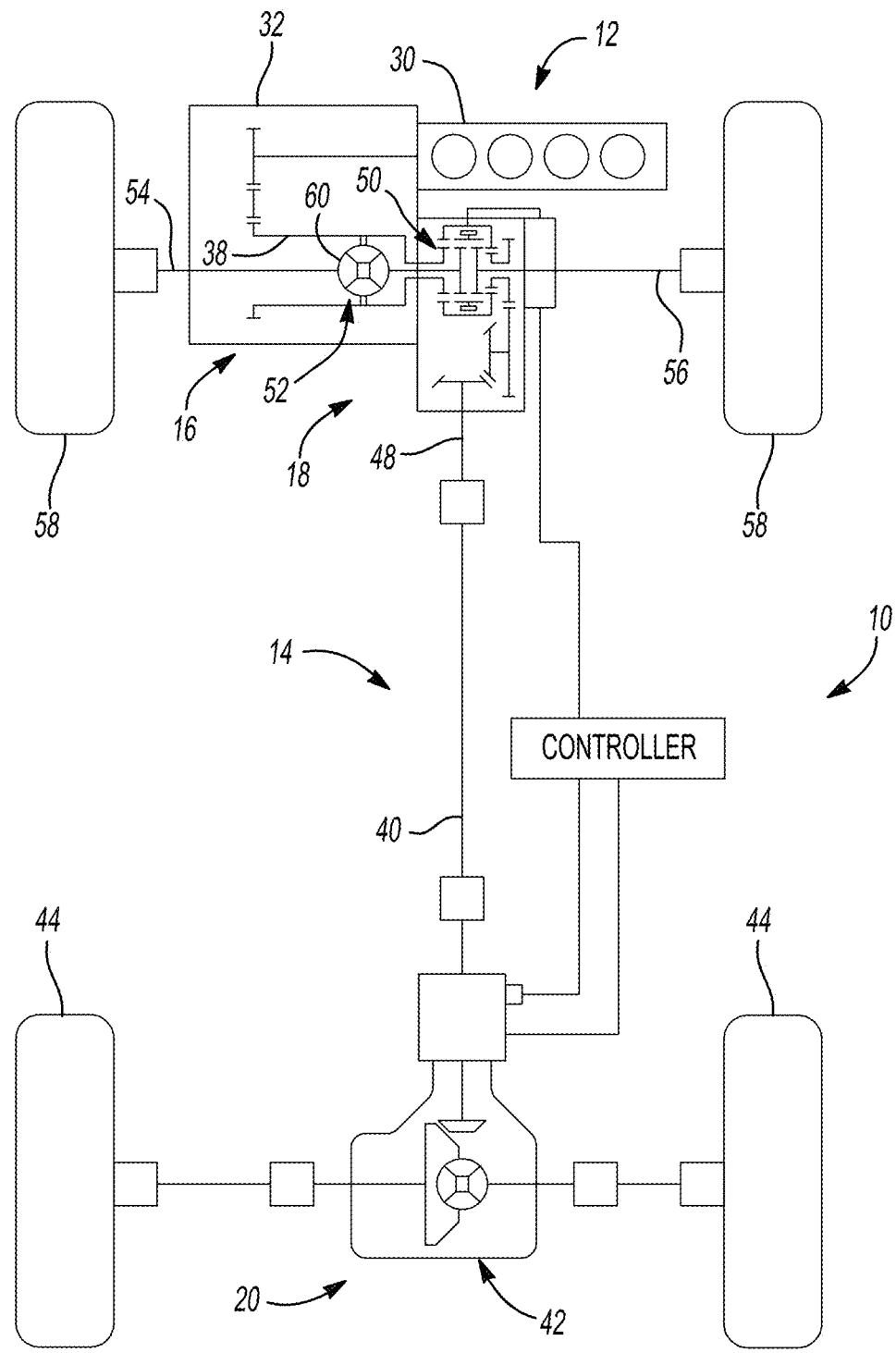
FIG. 1 is a schematic illustration of a vehicle having a disconnecting AWD driveline including a power take-off unit constructed in accordance with the teachings of the present disclosure.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which outputs rotary power to the primary driveline 16 and the PTU 18 via an output 38 of the transmission 32. The PTU 18 can be selectively operated to transmit rotary power to the secondary driveline 20. In the particular example provided, the secondary driveline 20 includes a propshaft 40 and a rear axle assembly 42 that is configured to receive rotary power from the propshaft 40 and to responsively drive a set of vehicle wheels 44. In the example provided, the PTU 18 includes a PTU output member 48 that is coupled to the propshaft 40 for common rotation about a longitudinal axis of the vehicle 10. As will be discussed in more detail below, the PTU 18 includes a disconnect mechanism 50 to selectively control power transmission through the PTU 18 to thereby selectively drive the propshaft 40.

The primary driveline 16 can include a first differential 52 and a pair of axle half-shafts (first half-shaft 54 and second half-shaft 56) that can couple an output of the first differential 52 to another set of vehicle wheels 58. Except as noted herein, the first differential 52 can be conventional in its construction and operation and as such, need not be discussed in significant detail herein. Briefly, the first differential 52 can include a differential case 60, which can be driven by the transmission 32, and a means for transmitting rotary power between the differential case 60 and the first and second half-shafts 54, 56. In the example provided, the rotary power transmitting means is an open differential gearset that permits speed and torque differentiation between the first and second half-shafts 54, 56.

Figure 2:
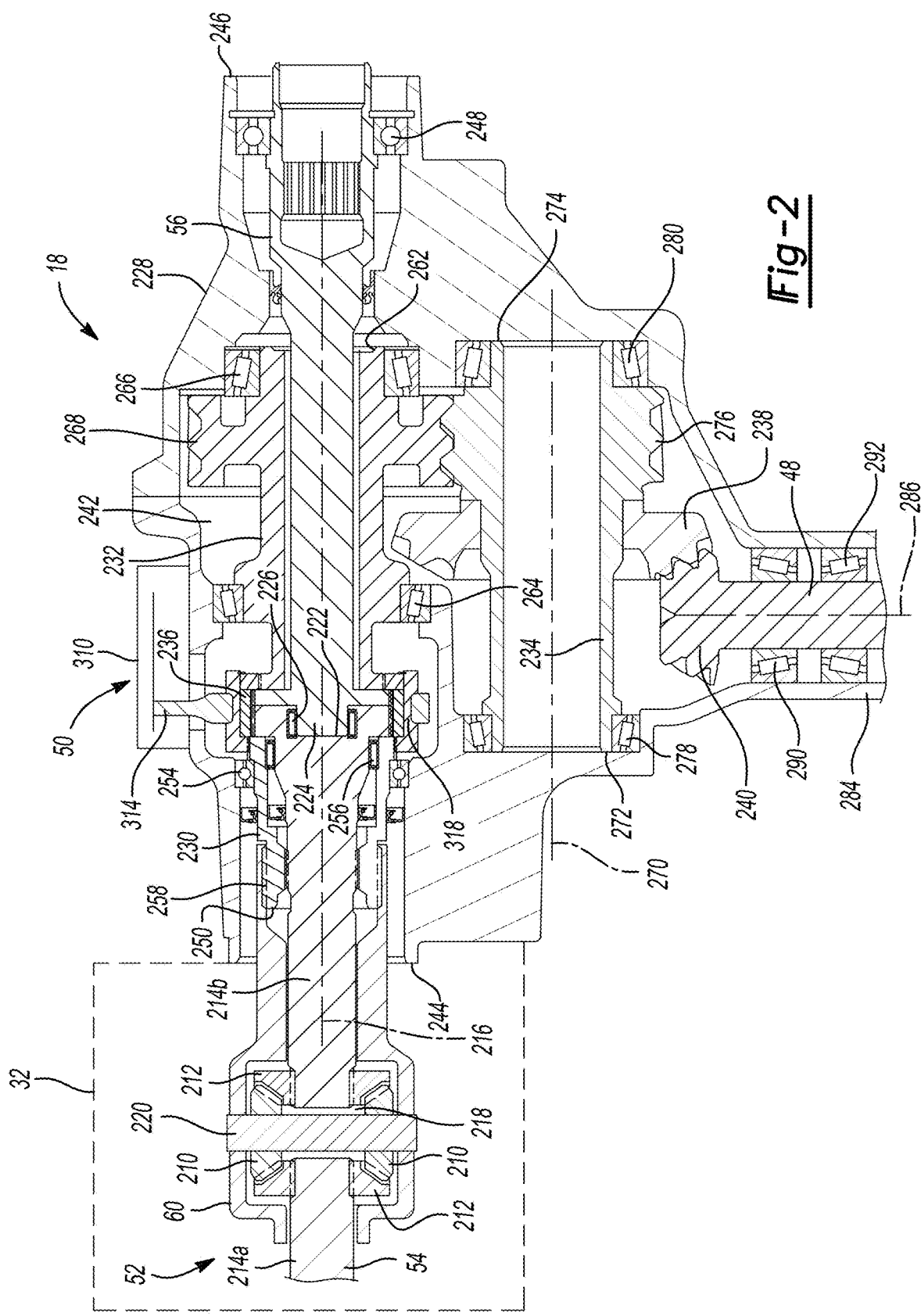
FIG. 2 is a sectional view of a portion of the AWD driveline including a portion of the power take-off unit that is schematically illustrated in FIG. 1.

With additional reference to FIG. 2, the PTU 18 and first differential 52 are illustrated in more detail. In the example provided, the first differential 52 can include the differential case 60, a pair of pinion gears 210, a pair of side gears 212, a first differential output 214a and a second differential output 214b. The differential case 60 can be driven by the output 38 (FIG. 1) of the transmission 32 (FIG. 1) to rotate about a first axis 216. The differential case 60 can define a differential cavity 218 and the pinion gears 210 can be disposed within the differential cavity 218.

The pinion gears 210 can be coupled to the differential case 60 for common rotation about the first axis 216 and for relative rotation about a differential axis that is transverse to the first axis 216. In the example provided, the pinion gears 210 are rotatably mounted to a cross-pin 220 that is transverse to the first axis 216 and coupled to the differential case 60 for common rotation about the first axis 216.

The side gears 212 can be disposed in the differential cavity 218 and rotatable about the first axis 216 relative to the differential case 60. Each differential output 214a, 214b can be coupled to a respective one of the side gears 212 for common rotation about the first axis 216 with the respective side gear 212. The side gears 212 can be meshingly engaged with the pinion gears 210 to provide differential torque to the differential outputs 214a, 214b when the differential case 60 receives input torque from the transmission 32 (FIG. 1).

Each half-shaft 54, 56 can be disposed about the first axis 216. The differential output 214a can be coupled to the first half-shaft 54 for common rotation about the first axis 216 and, in the example provided, is unitarily formed with the first half-shaft 54. The differential output 214b can be coaxial with the first axis 216 and the second half-shaft 56, but can be configured to be rotatable relative to the second half-shaft 56. In the example provided, the differential output 214b includes a central recess 222 and a portion 224 of the second half-shaft 56 extends axially into the central recess 222 and is supported for rotation relative to the differential output 214b by a bearing 226 that is disposed radially between the portion 224 of the second half-shaft 56 and the inner circumferential surface of the central recess 222.

The PTU 18 can include a housing 228, a PTU input member 230, a first intermediate member 232, a second intermediate member 234, a clutch member or coupling sleeve 236, the disconnect mechanism 50, a ring gear 238, the PTU output member 48, and a pinion gear 240.

The housing 228 can define a PTU cavity 242 and can be fixedly coupled to a rigid structure of the vehicle 10 (FIG. 1), such as a housing of the transmission 32 (FIG. 1) for example. The housing 228 can be formed of multiple shells or parts that are coupled together (e.g. bolted or welded) to define the PTU cavity 242. The differential output 214b can extend along the first axis 216, through a first side 244 of the housing 228 and into the PTU cavity 242. The second half-shaft 56 can extend along the first axis 216 through the PTU cavity 242 and through an opposite, second side 246 of the housing 228. In the example provided, the second half-shaft 56 is supported for rotation about the first axis 216 by the bearing 226 proximate to the first side 244 of the housing, and a bearing 248 disposed radially between the housing 228 and second half-shaft 56, proximate to the second side 246 of the housing 228.

The input member 230 can be a hollow, generally cylindrical member located within the PTU cavity 242 and disposed about the differential output 214b. The input member 230 can have a first end 250 and a second end 252. In the example provided, the input member 230 is supported within the PTU cavity 242 by a bearing 254 disposed radially between the housing 228 and the input member 230 and axially between the first and second ends 250, 252. The input member 230 can be rotatable relative to the housing 228 and rotatable relative to the differential output 214b and the second half-shaft 56. In the example provided, a bearing or bushing 256 is also disposed radially between the second end 252 of the input member 230 and the differential output 214b. The input member 230 can be coupled to the differential case 60 for common rotation about the first axis 216. In the example provided, the first end 250 of the input member 230 is coupled to the differential case 60 via mating splines 258, though other configurations can be used.

The first intermediate member 232 can be a hollow, generally cylindrical member disposed within the PTU cavity 242 and disposed about the second half-shaft 56. The first intermediate member 232 can have a first end 260 proximate to the second end 252 of the input member 230, and a second end 262 that is distal to the input member 230. In the example provided, the first intermediate member 232 is supported within the PTU cavity 242 for rotation about the first axis 216 by a bearing 264 proximate to the first end 260 of the first intermediate member 232, and by a bearing 266 proximate to the second end 262 of the first intermediate member 232. The bearings 264, 266 can be disposed radially between the housing 228 and the first intermediate member 232. The first intermediate member 232 can include a first intermediate gear 268. In the example provided, the first intermediate gear 268 is located proximate to the second end 262 of the first intermediate member 232.

The second intermediate member 234 can be a generally cylindrical member disposed within the PTU cavity 242 and disposed about a second axis 270. The second axis 270 can be parallel to and offset from the first axis 216. The second intermediate member 234 can have a first end 272 and a second end 274, and in the example provided, is a hollow member disposed about the second axis 270. The second intermediate member 234 can include a second intermediate gear 276, and in the example provided, the second intermediate gear 276 is located proximate to the second end 274 of the second intermediate member 234. The second intermediate gear 276 can be meshingly engaged with the first intermediate gear 268 to transmit torque therebetween. In the example provided, the second intermediate member 234 is supported within the PTU cavity 242 by a bearing 278 proximate to the first end 272 of the second intermediate member 234 and a bearing 280 proximate to the second end 274 of the second intermediate member 234. The bearings 278, 280 can be disposed radially between the housing 228 and the second intermediate member 234.

The ring gear 238 can be a bevel ring gear. The ring gear 238 can be fixedly coupled (e.g. welded or bolted) to the second intermediate member 234 for common rotation about the second axis 270. In the example provided, the ring gear 238 is located axially between the first and second ends 272, 274 of the second intermediate member 234, and axially between the first and second ends 272, 274 of the first intermediate member 232, though other configurations can be used.

The PTU output member 48 can extend into the PTU cavity 242 from a third side 284 of the housing 228 and can be disposed about a third axis 286. The third axis 286 can be not parallel (e.g. transverse) to the first and second axes 216, 270, and in the example provided, the third axis 286 is perpendicular to the first and second axes 216, 270. As described above with reference to FIG. 1, The PTU output member 48 can be drivingly coupled to the propshaft 40 (FIG. 1) to transmit rotary power to the secondary driveline 20.

The pinion gear 240 can be coupled to the PTU output member 48 for common rotation about the third axis 286. The pinion gear 240 can be a bevel pinion gear meshingly engaged with the ring gear 238. In the example provided, the ring gear 238 and pinion gear 240 are hypoid bevel gears, though the teeth of the ring gear 238 and the pinion gear 240 can have any suitable geometry, such as straight bevel gears, or spiral bevel gears for example. In the example provided, the PTU output member 48 is supported for rotation about the third axis 286 by a head bearing 290 disposed radially between the housing 228 and the PTU output member 48 proximate to the pinion gear 240, and a tail bearing 292 disposed radially between the housing 228 and the PTU output member 48 distal to the pinion gear 240.

The coupling sleeve 236 can be a generally cylindrical member disposed within the PTU cavity 242 and disposed about the first axis 216 for rotation about the first axis 216. The coupling sleeve 236 can be at least partially disposed axially between the second end 252 of the input member 230 and the first end 260 of the first intermediate member 232 as described in greater detail below.

Figure 3:
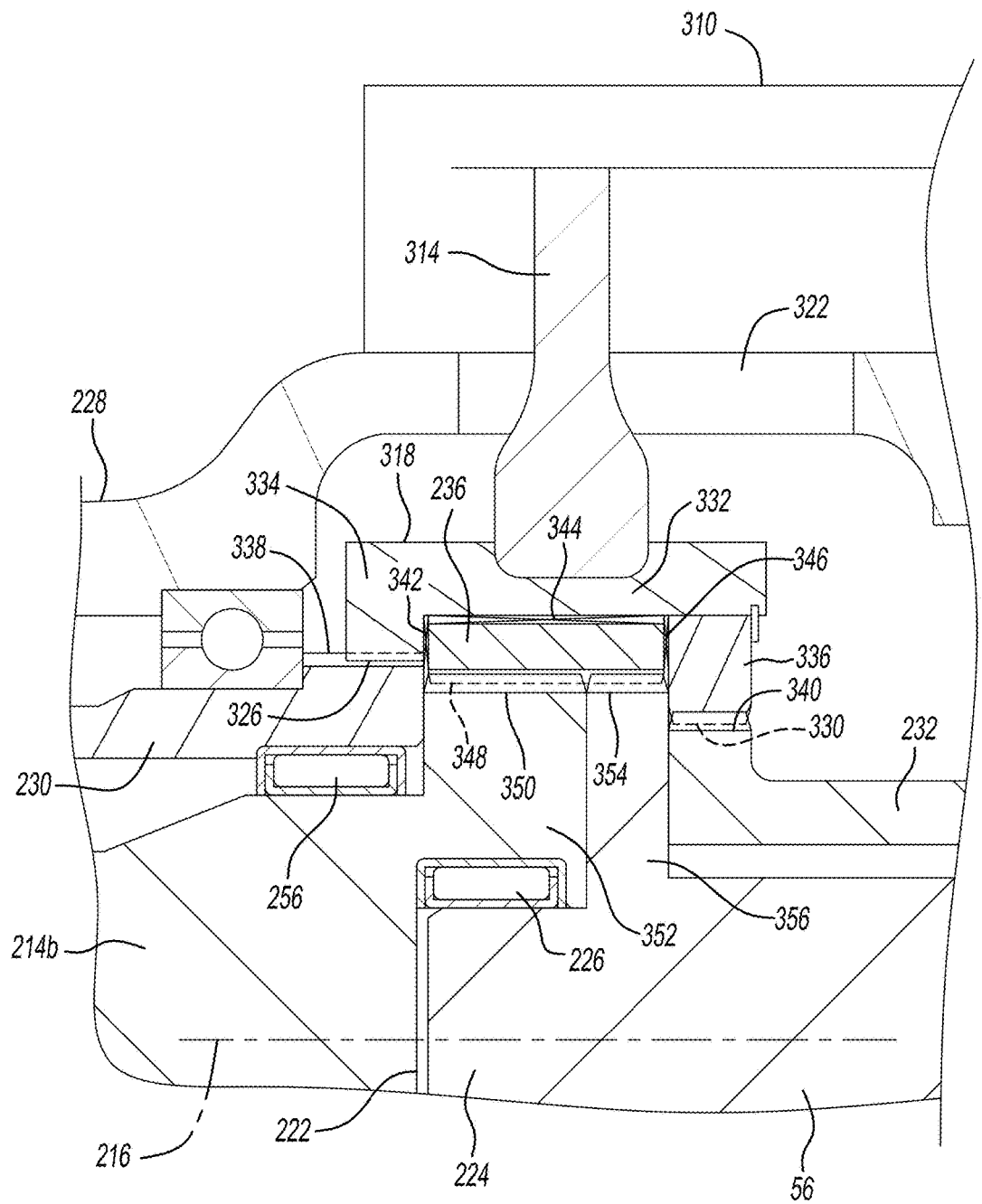
FIG. 3 is a sectional view of a portion of the power take-off unit shown in FIG. 2, illustrating a shift sleeve in a first position.

With additional reference to FIG. 3, the disconnect mechanism 50 can include an actuator 310, a shift fork 314, and a clutch member or shift sleeve 318. The actuator 310 can be any suitable type of actuator (e.g., a solenoid, hydraulic ram, or screw-type actuator) configured to move the shift fork 314 generally in the axial direction relative to the first axis 216. The actuator 310 can be mounted to the housing 228 and in the example provided, is mounted to an exterior of the housing 228, though other configurations can be used. The shift fork 314 can be at least partially disposed within the PTU cavity 242, and in the example provided, extends through an aperture 322 in the housing 228 and into the PTU cavity 242. While not specifically shown, the disconnect mechanism 50 can also include one or more sensors configured to determine the position of the shift fork 314 or the shift sleeve 318.

The shift sleeve 318 can be a generally cylindrical member disposed about the first axis 216. The shift sleeve 318 can be coupled to the shift fork 314 for common translation in the axial direction of the first axis 216 (i.e., along the first axis 216). The shift sleeve 318 can include a first set of internal teeth or splines 326, a second set of internal teeth or splines 330, and a central portion 332. The first and second sets of internal splines 326, 330 can be axially spaced apart by the central portion 332. In the example provided, the second set of internal splines 330 extend radially inward further than the first set of internal splines 326, such that the shift sleeve 318 can have an innermost diameter that is greater along the length of the first set of internal splines 326 than along the length of the second set of internal splines 330. In the particular example provided, the first set of internal splines 326 are on a first portion 334 of the shift sleeve 318 that is integrally formed with the central portion 332 and the second set of internal splines 330 are on a second portion 336 of the shift sleeve 318 that is coupled to the central portion 332 for common rotation and axial translation therewith, though other configurations can be used.

The input member 230 can define a first set of external teeth or splines 338 proximate to the second end 252 of the input member 230. The first set of external splines 338 can be configured to meshingly engage with the first set of internal splines 326. The first intermediate member 232 can define a second set of external teeth or splines 340 proximate to the first end 260 of the first intermediate member 232. In the example provided, the second set of external splines 340 are radially inward of the first set of external splines 338. The second set of external splines 340 can be configured to meshingly engage with the second set of internal splines 330.

The coupling sleeve 236 can be a generally cylindrical member disposed about the first axis 216 and axially between the first portion 334 and the second portion 336 of the shift sleeve 318. The coupling sleeve 236 is configured to be rotatable relative to the shift sleeve 318. In the particular example provided, the coupling sleeve 236 is nested within a recess of the shift sleeve 318 that is defined by the first, second, and central portions 332, 334, 336 such that the outer perimeter of the coupling sleeve 236 is radially outward of the inner perimeter of the first and second portions 334, 336 of the shift sleeve 318.

In the example provided, three bearings 342, 344, and 346 aid rotation of the coupling sleeve 236 relative to the shift sleeve 318. Bearing 342 is disposed axially between the coupling sleeve 236 and the first portion 334. Bearing 344 is disposed radially between the coupling sleeve 236 and the central portion 332 (e.g., in the recess defined by the first, second, and central portions 332, 334, 336). Bearing 346 is disposed axially between the coupling sleeve 236 and the second portion 336.

The coupling sleeve 236 can define a third set of internal teeth or splines 348 that can meshingly engage with a third set of external teeth or splines 350 defined by an end 352 of the differential output 214b and to meshingly engage with a fourth set of external teeth or splines 354 defined by an end 356 of the second half-shaft 56. In the example provided, the third set of external splines 350 is disposed axially between the second end 252 of the input member 230 and the fourth set of external splines 354, and is disposed radially inward of the first set of internal splines 326 and radially outward of the second set of internal splines 330. In the example provided, the fourth set of external splines 354 is axially between the third set of external splines 350 and the second set of internal splines 330, and is radially aligned with the third set of external splines 350.

Figure 4:
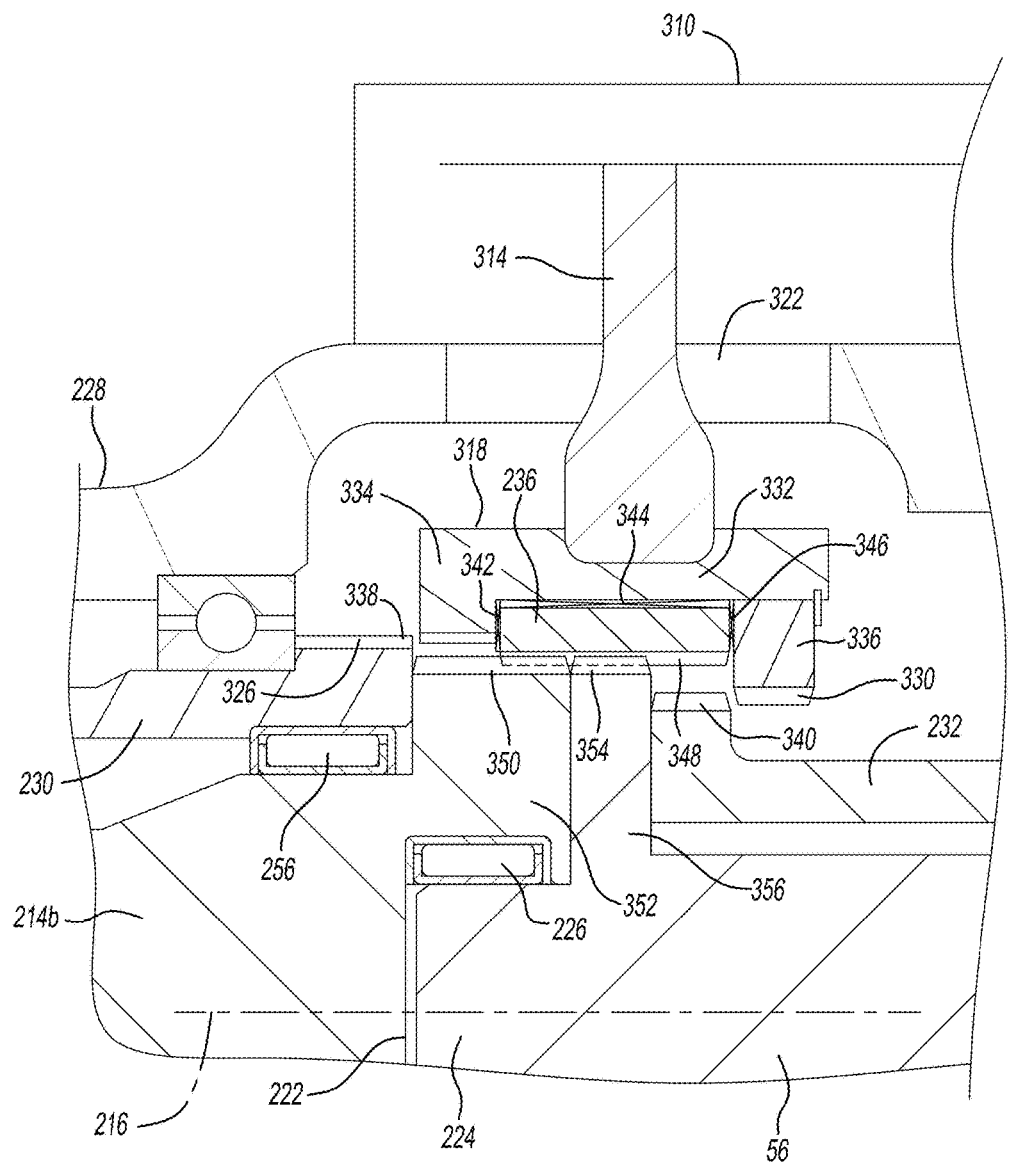
FIG. 4 is a sectional view similar to FIG. 3, illustrating the shift sleeve in a second position.
Figure 5:
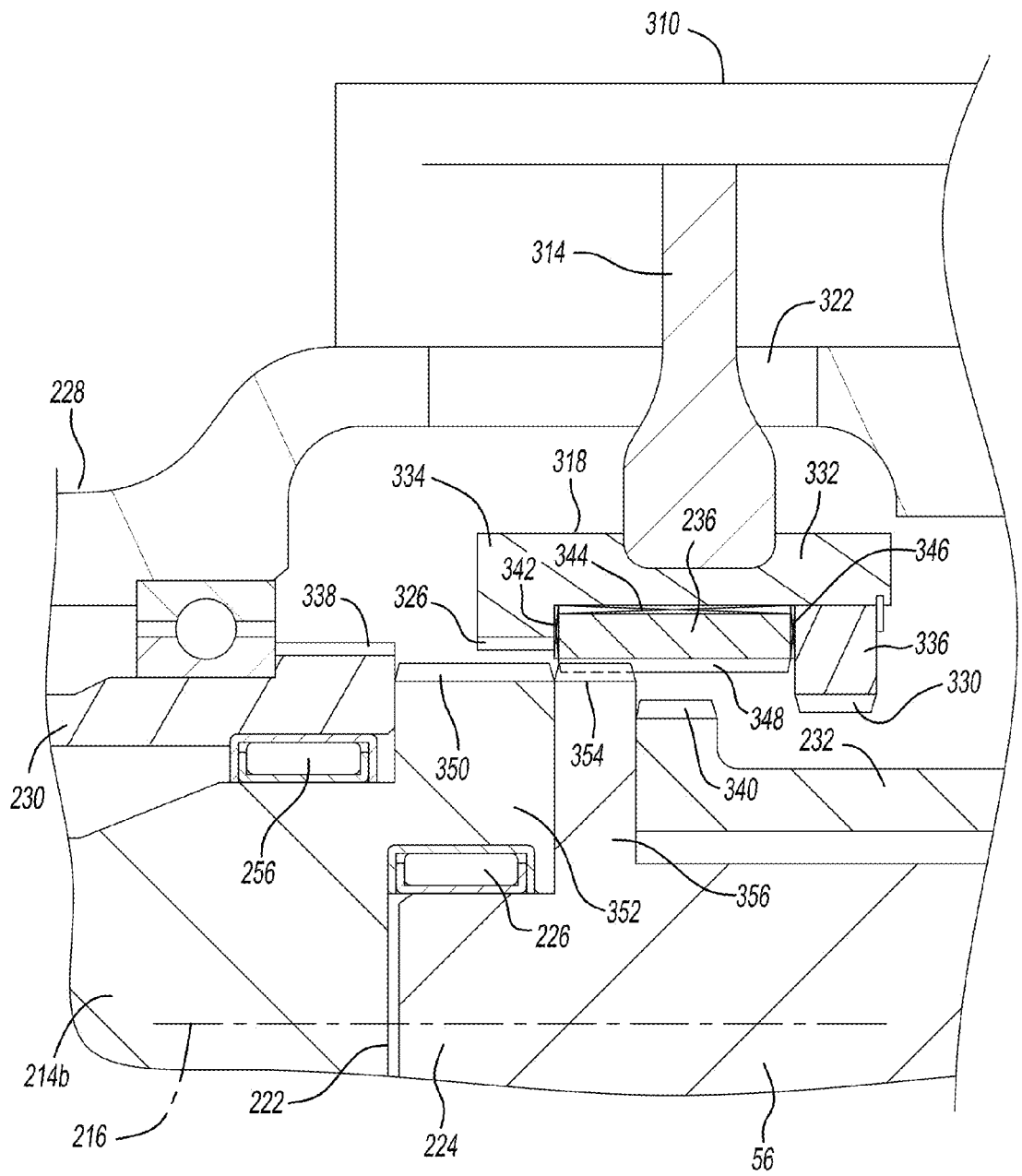
FIG. 5 is a sectional view similar to FIG. 3, illustrating the shift sleeve in a third position.

With reference to FIGS. 3, 4, and 5, the operation of the disconnect mechanism 50 is shown in greater detail. In general, the disconnect mechanism 50 can selectively provide output torque to the secondary driveline 20 (FIG. 1) and selectively disconnect the first and second drivelines 16, 20 (FIG. 1) with a single actuator (i.e. the actuator 310). In operation, the actuator 310 can be selectively, or automatically operated to move the shift fork 314, and thus move the shift sleeve 318 between a first position (e.g., AWD) shown in FIG. 3, a second position (e.g., 2WD or FWD) shown in FIG. 4, and a third position (e.g., disconnected or neutral) shown in FIG. 5.

With specific reference to FIG. 3, when transmission of power to the secondary driveline 20 (FIG. 1) is desired, the actuator 310 can move the shift fork 314 (and thus the shift sleeve 318) axially to position the shift sleeve 318 in the first position. When the shift sleeve 318 is in the first position, the first set of internal splines 326 is engaged with the first set of external splines 338, and the second set of internal splines 330 is engaged with the second set of external splines 340, such that the shift sleeve 318 couples the input member 230 to the first intermediate member 232 for common rotation about the first axis 216. When the shift sleeve 318 is in the first position, rotary power is transmitted from the transmission 32 (FIG. 1) to the differential case 60 (FIG. 2), from the differential case 60 (FIG. 2) to the input member 230, from the input member 230 to the shift sleeve 318, from the shift sleeve 318 to the first intermediate member 232.

When the shift sleeve 318 is in the first position, the coupling sleeve 236 is rotatable relative to the shift sleeve 318 and the third set of internal splines 348 is engaged with the third set of external splines 350 and the fourth set of external splines 354, such that the coupling sleeve 236 couples the differential output 214b to the second half-shaft 56 for common rotation about the first axis 216. Thus, when the shift sleeve 318 is in the first position, differential torque can be transmitted to the first and second half-shafts 54, 56, while torque is also transferred through the PTU 18 (FIGS. 1 and 2) to the secondary driveline 20 (FIG. 1).

With specific reference to FIG. 4, when power to the secondary driveline 20 (FIG. 1) is not desired, but power to the primary driveline 16 (FIG. 1) is desired, the actuator 310 can move the shift fork 314 (and thus the shift sleeve 318) axially to position the shift sleeve 318 in the second position. When the shift sleeve 318 is in the second position, the first set of internal splines 326 is disengaged from the first set of external splines 338, and the second set of internal splines 330 is disengaged with the second set of external splines 340, such that the input member 230 is decoupled from the first intermediate member 232 for relative rotation about the first axis 216. When the shift sleeve 318 is in the second position, the third set of internal splines 348 is engaged with the third set of external splines 350 and the fourth set of external splines 354, such that the coupling sleeve 236 couples the differential output 214b to the second half-shaft 56 for common rotation about the first axis 216.

In an alternative construction (not specifically shown) when the shift sleeve 318 is in the second position, the first set of internal splines 326 can remain engaged with the first set of external splines 338 while the second set of internal splines 330 can be disengaged from the second set of external splines 340. In yet another alternative construction (not specifically shown) when the shift sleeve 318 is in the second position, the first set of internal splines 326 can be disengaged from the first set of external splines 338 while the second set of internal splines 330 remains engaged from the second set of external splines 340.

With specific reference to FIG. 5, when power is not desired to either of the primary or secondary drivelines 16, 20 (FIG. 1), such as during flat towing for example, the actuator 310 can move the shift fork 314 (and thus the shift sleeve 318) axially to position the shift sleeve 318 in the third position. When the shift sleeve 318 is in the third position, the first set of internal splines 326 are disengaged from the first set of external splines 338, the second set of internal splines 330 are disengaged from the second set of external splines 340, and the third set of internal splines 348 are disengaged from the third set of external splines 350. In the example provided, when the shift sleeve 318 is in the third position, the third set of internal splines 348 remain engaged with the fourth set of external splines 354. In other words, when the shift sleeve 318 is in the third position, the differential case 60 (FIG. 2), the first intermediate member 232, the differential output 214b, and the second half-shaft 56 are rotatable relative to each other. Thus, the vehicle 10 can be towed with the front and rear wheels 44, 58 on the ground without back driving the primary driveline 16.

In an alternative construction (not specifically shown) when the shift sleeve 318 is in the third position, the first set of internal splines 326 can remain engaged with the first set of external splines 338 while the second set of internal splines 330 can be disengaged from the second set of external splines 340. In yet another alternative construction (not specifically shown) when the shift sleeve 318 is in the third position, the first set of internal splines 326 can be disengaged from the first set of external splines 338 while the second set of internal splines 330 remains engaged from the second set of external splines 340. In yet another alternative construction (not specifically shown) when the shift sleeve 318 is in the third position, the third set of internal splines 348 can remain engaged with the third set of external splines 350 while being disengaged from the fourth set of external splines 354.

With additional reference to FIGS. 6-9, a portion of a PTU 18' is shown. The PTU 18' is similar to the PTU 18. Except as otherwise shown or described herein, elements with primed reference numerals (e.g., 56') are similar to elements having similar, but non-primed reference numerals (e.g., 56). Accordingly, the descriptions of the similar elements are incorporated herein by reference. Specifically, the end 356' of the second half-shaft 56' includes a fifth set of external splines 610. In the example provided, the fifth set of external splines 610 are axially between the fourth set of external splines 354' and the second set of external splines 340', and are radially aligned with the second set of external splines 340'.

Figure 6:
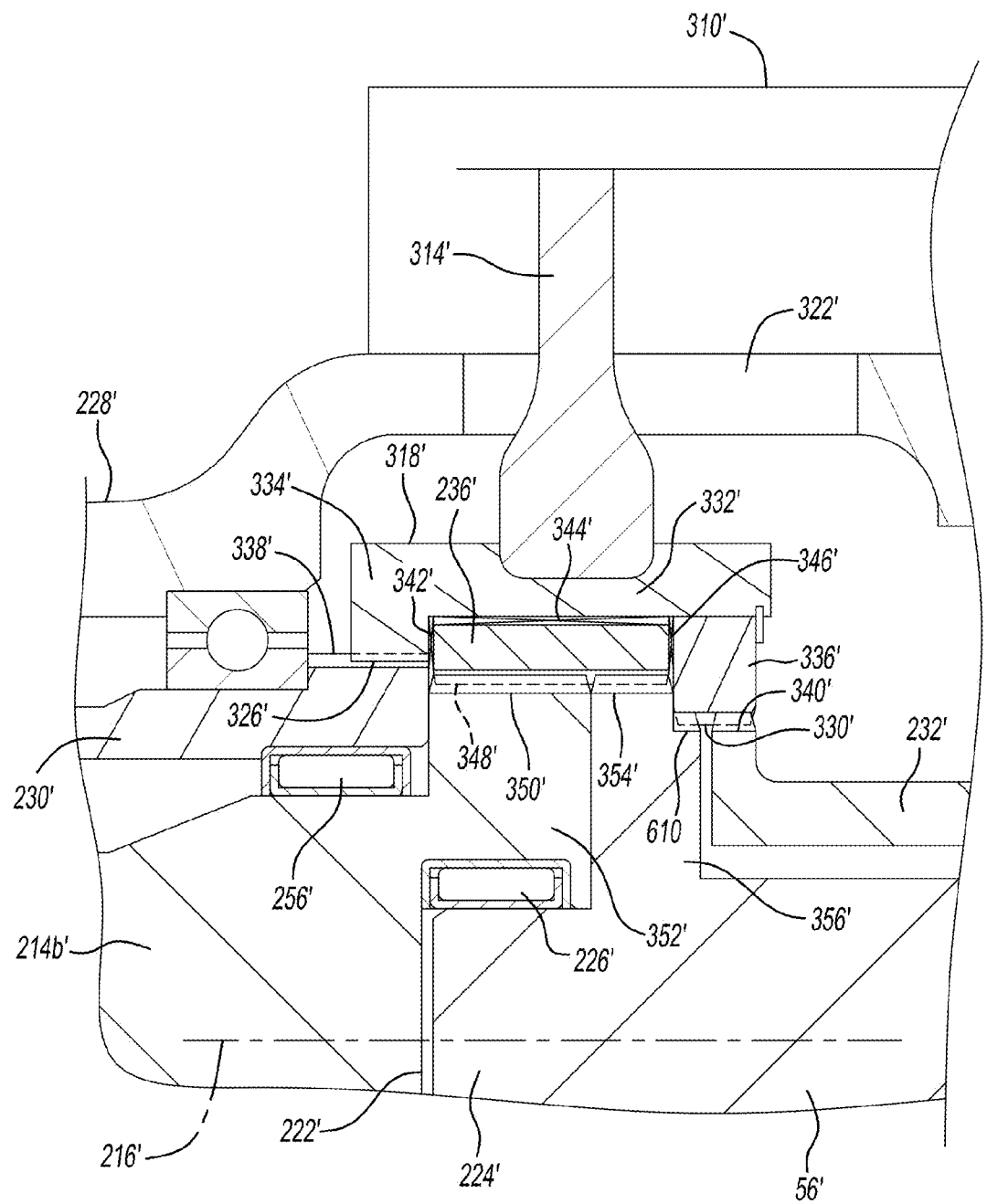
FIG. 6 is a sectional view of a portion of a power take-off unit of another construction, illustrating a shift sleeve in a first position.

With specific reference to FIG. 6, when transmission of power to the secondary driveline 20 (FIG. 2) is desired, and equal torque to the primary drive wheels 58 (FIG. 1) is desired, the actuator 310' can move the shift fork 314' (and thus the shift sleeve 318') axially to position the shift sleeve 318' in a first position. The first position of the shift sleeve 318' is similar to the first position of the shift sleeve 318 (FIG. 3), except that the second set of internal splines 330' engages both the fifth set of external splines 610 and the second set of external splines 340'. In the first position, the third set of internal splines 348' engages the third set of external splines 350' and the fourth set of external splines 354'. Thus, when the shift sleeve 318' is in the first position, the differential (e.g., differential 52 shown in FIG. 2) can be locked. In other words, the PTU 18' provides equal torque to the first half-shaft (e.g., first half-shaft 54; FIG. 2) and the second half-shaft 56', while power can also be provided to the secondary driveline 20 (FIG. 2).

Figure 7:
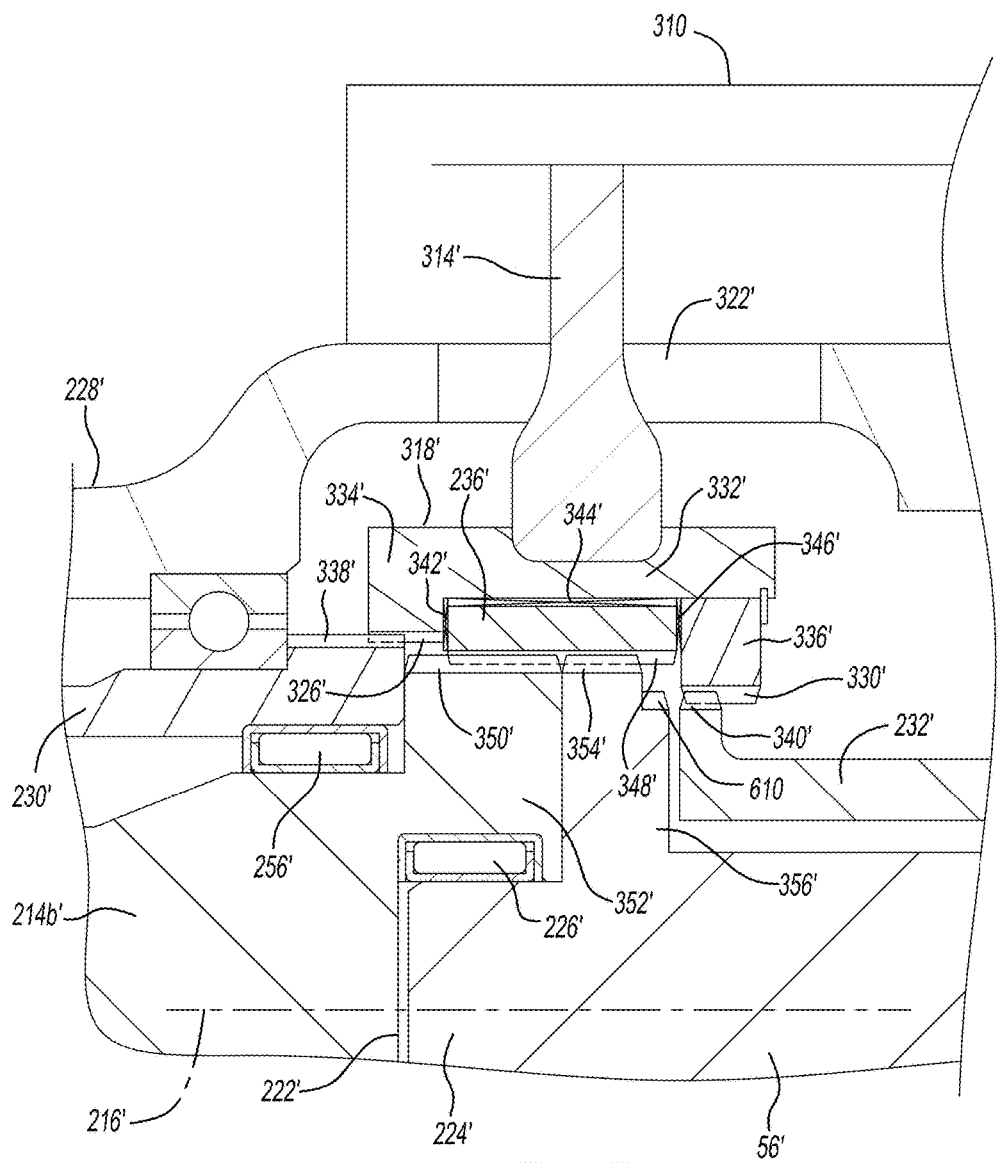
FIG. 7 is a sectional view similar to FIG. 6, illustrating the shift sleeve in a second position.

With specific reference to FIG. 7, when transmission of power to the secondary driveline 20 (FIG. 1) is desired, but differential power to the primary drive wheels 58 (FIG. 1) is desired, the actuator 310' can move the shift fork 314' (and thus the shift sleeve 318') axially to position the shift sleeve 318' in a second position. The second position of the shift sleeve 318' is similar to the first position of the shift sleeve 318 (FIG. 3). When the shift sleeve 318' is in the second position, the second set of internal splines 330' are disengaged from the fifth set of external splines 610. Similar to the first position of the shift sleeve 318 (FIG. 3), when the shift sleeve 318' is in the second position, rotary power is transmitted from the transmission 32 (FIG. 1) to the differential case 60 (FIG. 2), from the differential case 60 (FIG. 2) to the input member 230', from the input member 230' to the shift sleeve 318', from the shift sleeve 318' to the first intermediate member 232', while the coupling sleeve 236' couples the differential output 214b' and the second half-shaft 56'.

Figure 8:
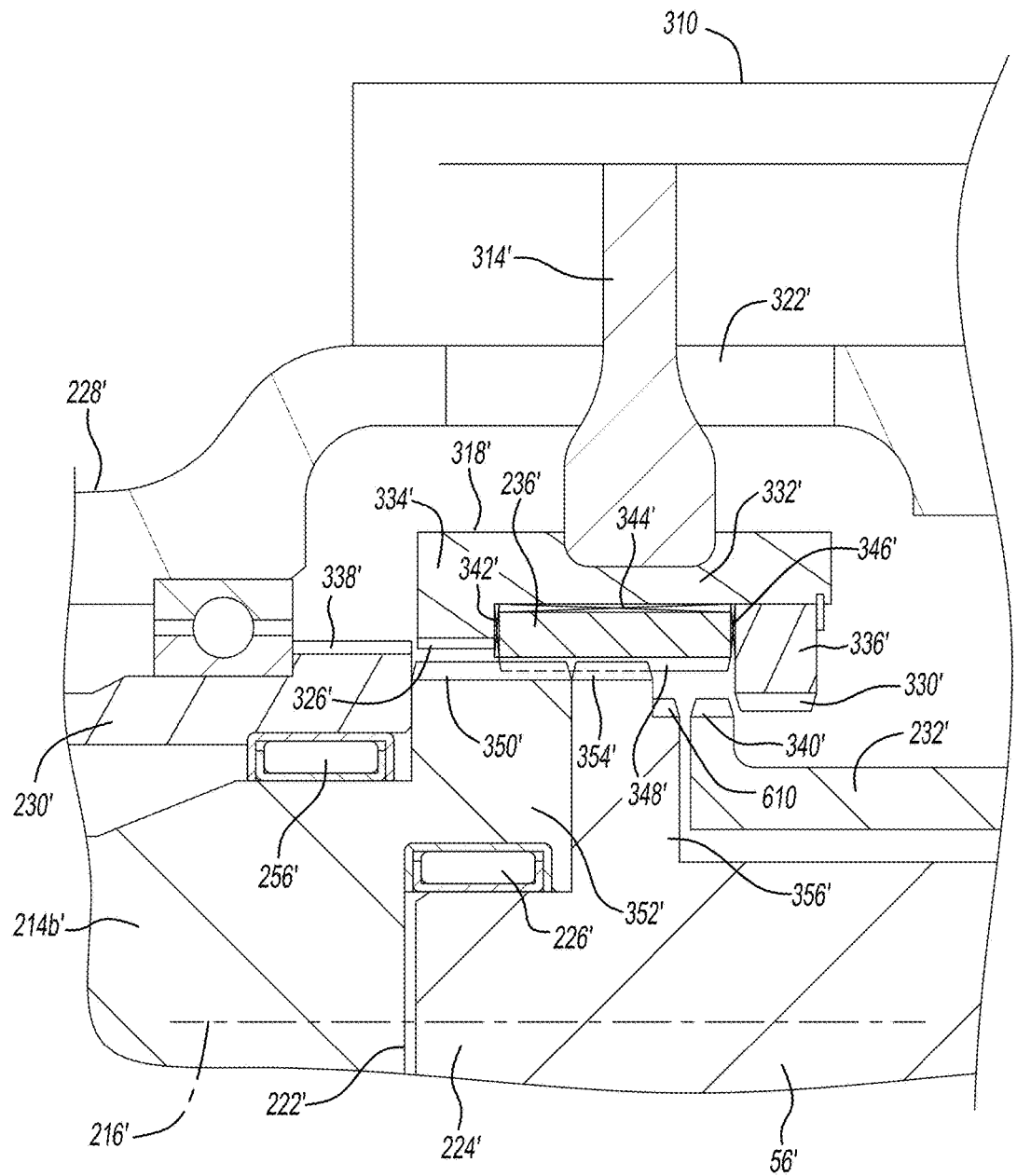
FIG. 8 is a sectional view similar to FIG. 6, illustrating the shift sleeve in a third position.

With specific reference to FIG. 8, when power to the secondary driveline 20 (FIG. 1) is not desired, but power to the primary driveline 16 (FIG. 1) is desired, the actuator 310' can move the shift fork 314' (and thus the shift sleeve 318') axially to position the shift sleeve 318' in a third position. The third position of the shift sleeve 318' is similar to the second position of the shift sleeve 318 (FIG. 4).

Figure 9:
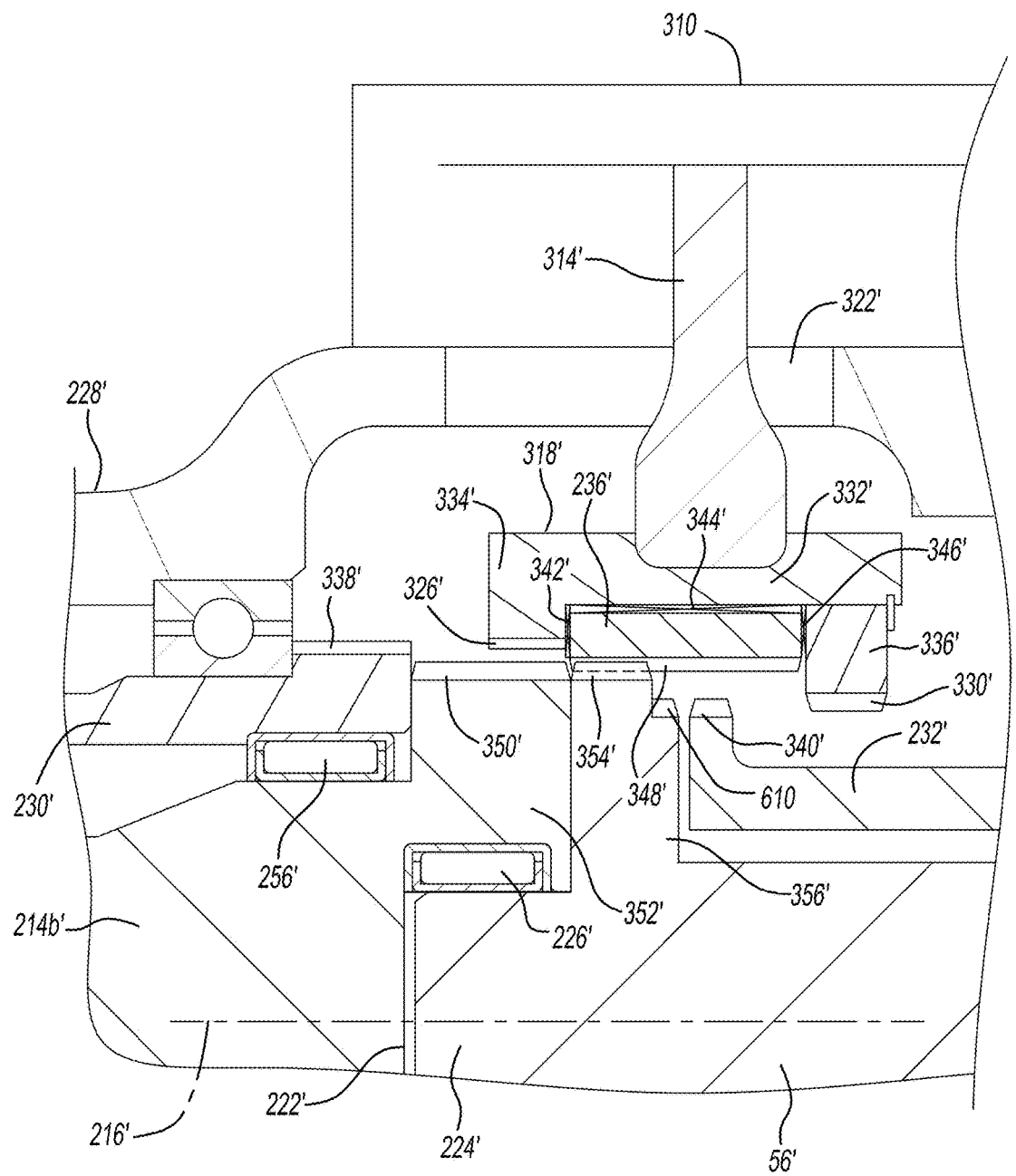
FIG. 9 is a sectional view similar to FIG. 6, illustrating the shift sleeve in a fourth position.

With specific reference to FIG. 9, when power is not desired to either of the primary or secondary drivelines 16, 20 (FIG. 1), such as during flat towing for example, the actuator 310' can move the shift fork 314' (and thus the shift sleeve 318') axially to position the shift sleeve 318' in a fourth position. The fourth position of the shift sleeve 318' is similar to the third position of the shift sleeve 318 (FIG. 5).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An all-wheel drive vehicle driveline comprising:
    a PTU input member that is rotatable about a first rotary axis;
    a spindle that is rotatable about the first rotary axis;
    a stub shaft that is rotatable about the first rotary axis;
    an axle shaft received through the spindle and rotatable about the first rotary axis;
    a PTU clutch that is operable in a first PTU clutch mode, in which the PTU input member is rotatably coupled to the spindle, and a second PTU clutch mode in which the PTU input member is rotatably decoupled from the spindle; and
    a stub shaft clutch that is operable in a first stub shaft clutch mode, in which the stub shaft is rotatably coupled to the axle shaft, and a second stub shaft clutch mode, in which the stub shaft is rotatably de-coupled from the axle shaft.

2. The all-wheel drive vehicle driveline of claim 1, wherein the PTU clutch has a first clutch member that is movable along the first rotary axis and the stub shaft clutch has a second clutch member that is movable along the first rotary axis.

3. The all-wheel drive vehicle driveline of claim 2, wherein the second clutch member is coupled to the first clutch member for movement therewith along the first rotary axis, and wherein the second clutch member is rotatable relative to the first clutch member about the first rotary axis when the PTU clutch is operated in either of the first PTU clutch mode and the second PTU clutch mode.

4. The all-wheel drive vehicle driveline of claim 3, further comprising an actuator having an actuator output member that is movable along the first rotary axis, and wherein the actuator output member is axially but non-rotationally coupled to the first clutch member.

5. The all-wheel drive vehicle driveline of claim 1, wherein the PTU clutch is further operable in a third PTU clutch mode, in which the PTU input member is rotationally coupled to both the spindle and the axle shaft, and wherein the axle shaft is rotatably de-coupled from both the spindle and the PTU input member when the PTU clutch is operated in either of the first and second PTU clutch modes.

6. The all-wheel drive vehicle driveline of claim 1, wherein the stub shaft is received through the PTU input member.

7. The all-wheel drive vehicle driveline of claim 6, wherein an end of the stub shaft that faces a respective end of the axle shaft is larger in diameter than a hole through the PTU input member into which the stub shaft is received.

8. The all-wheel drive vehicle driveline of claim 7, wherein the respective end of the axle shaft is larger in diameter than an aperture through the spindle through which the axle shaft is received.

9. The all-wheel drive vehicle driveline of claim 1, wherein a bearing is disposed between the stub shaft and the axle shaft.

10. The all-wheel drive vehicle driveline of claim 1, further comprising:
    a ring gear drivingly coupled to the spindle; and
    an output pinion meshed with the ring gear, the output pinion being disposed for rotation about a second rotary axis that is transverse to the first rotary axis.

11. The all-wheel drive vehicle driveline of claim 10, wherein the ring gear is rotatable about a third rotary axis that is parallel to but offset from the first rotary axis.

12. The all-wheel drive vehicle driveline of claim 11, further comprising:
    an first intermediate gear coupled to the spindle for rotation therewith;
    an intermediate shaft rotatably disposed about the third rotary axis, the intermediate shaft being coupled to the ring gear for rotation therewith; and
    a second intermediate gear rotatably coupled to the intermediate shaft and meshingly engaged with the first intermediate gear.

13. An all-wheel drive vehicle driveline comprising:
    a PTU input member that is rotatable about a first rotary axis;
    a spindle that is rotatable about the first rotary axis;
    a stub shaft that is rotatable about the first rotary axis;
    an axle shaft received through the spindle and rotatable about the first rotary axis;
    a multi-disconnect mechanism having:
        a first connection member that is selectively coupled to a first mating connection member coupled to the PTU input member for rotation therewith;
        a second connection member that is selectively coupled to a second mating connection member coupled to the spindle for rotation therewith;
        a third connection member that is coupled to the stub shaft for rotation therewith;
        a fourth connection member that is coupled to the axle shaft for rotation therewith; and
        a fifth connection member that is selectively coupled to at least one of the third and fourth connection members;
    wherein the multi-disconnect is selectively operable in a first mode, a second mode and a third mode;
    wherein the first connection member is rotatably coupled to the first matting connection member, the second connection member is rotatably coupled to the second mating connection member, and the fifth connection member is rotatably coupled to the third and fourth connection members when the multi-disconnect is operated in the first mode;
    wherein the first connection member is rotatably decoupled from the first mating connection member, the second connection member is rotatably decoupled from the second mating connection member, and the fifth connection member is rotatably coupled to the third and fourth connection members when the multi-disconnect is operated in the second mode; and
    wherein the first connection member is rotatably decoupled from the first mating connection member, the second connection member is rotatably decoupled from the second mating connection member, and the fifth connection member is rotatably decoupled from the third and fourth connection members when the multi-disconnect is operated in the third mode.

14. The all-wheel drive vehicle driveline of claim 13, wherein the multi-disconnect is further operable in a fourth mode in which the first connection member rotatably coupled to the first mating connection member, the second connection member is rotatably coupled to the second mating connection member and to a third mating connection member that is coupled to the axle shaft for rotation therewith, and the fifth connection member is rotatably coupled to the third and fourth connection members.

15. The all-wheel drive vehicle driveline of claim 14, wherein each of the first, second, third, fourth and fifth connection members comprises at least one set of teeth.

16. The all-wheel drive vehicle of claim 13, wherein each of the first, second, third, fourth and fifth connection members comprises at least one set of teeth.

17. The all-wheel drive vehicle of claim 16, wherein the teeth of the third connection member and the teeth of the fourth connection member are smaller in diameter than the teeth of the first connection member.

18. The all-wheel drive vehicle of claim 17, wherein the teeth of the second connection member are smaller in diameter than the teeth of the third connection member and the teeth of the fourth connection member.

19. The all-wheel drive vehicle driveline of claim 13, further comprising:
   a ring gear drivingly coupled to the spindle; and
   an output pinion meshed with the ring gear, the output pinion being disposed for rotation about a second rotary axis that is transverse to the first rotary axis.

20. The all-wheel drive vehicle driveline of claim 19, wherein the ring gear is rotatable about a third rotary axis that is parallel to but offset from the first rotary axis.

21. The all-wheel drive vehicle driveline of claim 20, further comprising:
   an first intermediate gear coupled to the spindle for rotation therewith;
   an intermediate shaft rotatably disposed about the third rotary axis, the intermediate shaft being coupled to the ring gear for rotation therewith; and
   a second intermediate gear rotatably coupled to the intermediate shaft and meshingly engaged with the first intermediate gear.

* * * * *